United States Patent
Rhoades et al.

(10) Patent No.: US 6,701,529 B1
(45) Date of Patent: Mar. 9, 2004

(54) SMART PADDING SYSTEM UTILIZING AN ENERGY ABSORBENT MEDIUM AND ARTICLES MADE THEREFROM

(75) Inventors: Lawrence J. Rhoades, Pittsburgh, PA (US); John M. Matechen, Irwin, PA (US); Mark J. Rosner, Greensburg, PA (US)

(73) Assignee: Extrude Hone Corporation, Irwin, PA (US)

( * ) Notice: Subject to any disclaimer, the term of this patent is extended or adjusted under 35 U.S.C. 154(b) by 0 days.

(21) Appl. No.: 09/489,513

(22) Filed: Jan. 21, 2000

Related U.S. Application Data
(60) Provisional application No. 60/118,956, filed on Feb. 5, 1999.

(51) Int. Cl.$^7$ .............................. F41H 1/04; B32B 5/02; C08L 83/04
(52) U.S. Cl. ................ 2/2.5; 2/455; 442/135; 528/30; 525/477; 556/402; 428/297.4; 428/299.7; 428/372
(58) Field of Search ................ 252/75, 78.3; 525/474, 525/477; 528/30; 556/402; 260/375 B; 442/134, 135; 2/2.5, 455, 456, 457, 16, 459, 460, 461, 462, 463, 464, 465, 466, 467, 468; 428/297.4, 299.7, 372

(56) References Cited

U.S. PATENT DOCUMENTS

| | | | |
|---|---|---|---|
| 3,801,535 A | | 4/1974 | Joschko ................ 260/29.1 |
| 3,997,214 A | * | 12/1976 | Jacobs .................. 297/202 |
| 4,339,339 A | * | 7/1982 | Maciejewski ............ 252/75 |
| 4,413,429 A | | 11/1983 | Power .................... 36/44 |
| 4,471,538 A | * | 9/1984 | Pomeranz et al. ...... 188/322.5 |
| 4,664,857 A | * | 5/1987 | Nambu .................. 264/28 |
| 4,722,946 A | | 2/1988 | Hostettler .............. 521/158 |
| 5,125,191 A | | 6/1992 | Rhoades ................ 51/317 |
| 5,350,610 A | | 9/1994 | Mashita et al. ......... 428/35 |
| 5,362,543 A | * | 11/1994 | Nickerson .............. 428/68 |
| 5,506,290 A | * | 4/1996 | Shapero ................. 524/389 |
| 5,507,866 A | * | 4/1996 | Drew et al. ............. 106/287.1 |
| 5,527,204 A | * | 6/1996 | Rhoades ................. 451/40 |
| 5,580,917 A | | 12/1996 | Maciejewski et al. .... 524/268 |
| 5,824,755 A | * | 10/1998 | Hayashi et al. .......... 526/206 |
| 5,854,143 A | | 12/1998 | Schuster et al. ......... 442/135 |
| 5,869,164 A | * | 2/1999 | Nickerson et al. ....... 297/452.41 |
| 5,990,205 A | * | 11/1999 | Cordova ................. 524/55 |
| 6,080,345 A | * | 6/2000 | Chalasani et al. ........ 264/109 |
| 6,347,411 B1 | * | 2/2002 | Darling .................. 2/272 |

FOREIGN PATENT DOCUMENTS

| | | |
|---|---|---|
| EP | 0298449 | 1/1989 |
| FR | 2133082 | 11/1972 |
| JP | (1992)04-117903 | 4/1992 |
| JP | (1992)04-117974 | 4/1992 |
| WO | WO88108860 | 11/1988 |

OTHER PUBLICATIONS

Article titled "Shear Thinning and Thickening".*
English language abstract to Russian Patent No. RU 2070903, published Dec. 27, 1996 (1 p.).

* cited by examiner

Primary Examiner—Paul Thibodeau
Assistant Examiner—Kevin M. Bernatz
(74) Attorney, Agent, or Firm—Webb Ziesenheim Logsdon Orkin & Hanson, P.C.

(57) ABSTRACT

The present invention relates to an energy absorbent medium which is compliant and conformable in the absence of an applied force, and stiffens in response to the rate of an applied force to dissipate energy. The medium comprises a blend of a polymer and a lubricant incompatible with the polymer to produce a conformable absorbent which exhibits dilatant (shear thickening) characteristics under high rates of force or stress. The polymer has reformable sacrificial chemical bonds which are broken under a high rate of deformation and which reform under static conditions. Suitable polymers for the invention include polyborosiloxanes. Applications for the medium include absorbent for sports padding, athletic equipment, motor vehicle seats, bulletproof vests, medical equipment, industrial equipment, weaponry, and playing fields.

38 Claims, 6 Drawing Sheets

SMART PADDING SYSTEM UTILIZING AN ENERGY ABSORBENT MEDIUM AND ARTICLES MADE THEREFROM

This application claims the benefit of Provisional application No. 60/118,956, filed Feb. 5, 1999.

FIELD OF THE INVENTION

The present invention relates to an energy absorbent medium and, in particular, to a polymeric based material for absorption and dispersion of impact energy which is formable into articles useful in the protection of animate and inanimate objects.

BACKGROUND OF THE INVENTION

Padding materials and structures have been developed to protect animate objects such as the human body, and inanimate objects which are susceptible to injury or damage when subjected to shock, vibration or stress.

In a number of contexts the human body requires protection from external impact and vibration beyond the normal protection afforded by the structure of the body itself. For instance, impact stress is a significant concern in contact sports such as football, hockey and soccer in which the participant is periodically or constantly subject to high impact stress. Bruising, fracture, joint impact trauma and osteoarthritis, susceptibility to sprains, muscle cramps, tendinitis, and strains, fatigue, and discomfort are all incidents of such impact stress being imparted to the body of the participant.

Another example of high impact stress attenuation is represented by the absorbent of seats, steering wheels, and structures surrounding the driver of a vehicle, designed to cushion the body of the driver in motor sports.

For those who are confined to bed, in wheel chairs, or in body contact with other medical implements requiring prolonged contact between the body and the implement, the difficulties can be quite substantial. As those involved in the field well understand, substantial problems arise from contact between the body and articles which require prolonged contact with the body, such as medical devices, prosthetics, orthopedic implements, such as casts, braces and the like, aids for the disabled such as wheelchairs, crutches, beds for those who are confined there. Through prolonged or high stress contact, a variety of undesirable consequences often plague the users of such constructs. Problems range from ulcerations (bed sores), to dermal inflammation, blisters, and simple irritation and discomfort.

Padding in use today for energy dissipation, cushioning or shock absorbing applications is typically made of assorted foams, urethanes and plastic, rubber, and metal. The materials are formed into shape by stitching, die cutting, molding or shearing. Pre-formed pads are made in various sizes that conform over a limited range of applications. Pads molded from foams produce a solid, semi-stiff piece. Although molded pads may be custom fit to an object or an individual, they are not compliant to the object or user. Molded pads, for instance, do not change shape as the anatomy of the user may change during a given activity. For example, a jet fighter pilot's body changes under g-forces and may swell at higher altitudes. Another example is present in motorsports where a race car driver can lose over ten pounds during a race, in which case a custom molded seat would then be too loose and not provide the needed support. Metal pads offer protection against shock, however lack comfort and are not lightweight and provide little or no vibration protection. In some instances metal pads are the cause of damage.

Polymer gel padding is currently being used in applications where cushioning is required. The gels are typically manufactured from silicone and urethane elastomers which are cross linked into specific geometries. The gel pads are extremely soft and easily compressed, but do not flow and could not be classified as a fluid. When weight is applied the gel pad is soft enough that it will collapse to support the weight, but only in a single dimension. It is generally recognized that polymer gel padding does not offer significant shock protection or protection from side-to-side motions or g-force loading. The person or object will typically move around in the padding since it will not shear. In many instances the object to be protected may "bottom out" within the padding. These padding materials are typically of higher specific gravity than the current invention which incorporates lower specific gravity fillers.

It would be particularly beneficial to produce a padding composition which overcomes the limitations of current padding, and which also exhibits the capability to change the padding's physical characteristics in response to applied loads or forces.

Traditional padding does not generally maintain intimate contact with the portion of a human body to be protected. In order for the body to be totally supported by the padding, the substrate material must crush to accommodate the contours of the body. Under sudden applied force, a human body or inanimate object will often move around within the voids between the padding and the user or object.

Accordingly it is a principal object of the present invention to provide compositions, structures and padding articles made therefrom which are conformable to the surface of an animate or inanimate object, and which responds to an applied force or stress by minimizing the transfer of such force or stress to the object.

It is an object of the present invention to provide for prolonged or high impact or vibration stress contact structures which respond elastically to applied impact forces between an animate or inanimate object and the structure to limit peak impact force applied to the object.

It is an object of the present invention to provide padding articles for use in contact sports such as football, hockey, soccer and basketball that are conformable to the human body and which exhibit the characteristic of a viscous liquid in the absence of a sudden applied force, and convert to a near solid elastomer in response to a high rate applied force to minimize the transfer of the force to the human body.

It is an object of the present invention to provide padding articles which respond elastically to applied vibration and forces between an object and the article to attentuate the vibration and force applied to the object.

It is another object of the present invention to provide articles for prolonged or high impact or vibration stress contact which are highly conformable to, and supportive of, the object surface configuration.

It is a further object of the present invention to provide for prolonged or high impact or vibration stress contact structures which respond resiliently to applied impact forces between an object and the structure with controlled or tuned elastic hysteresis.

An additional object of the present invention is to provide for prolonged or high impact or vibration stress contact absorbent, cushions, and like structures which provide for improved tolerance of the human body to contact with medical appliances and related structures and articles, including neck braces, wheel chair cushions, bed pads, absorbent for orthopedic appliances such as braces, casts and the like.

SUMMARY OF THE INVENTION

Generally, the present invention provides a high impact energy absorbent medium comprising the use of a conformable, resilient component which includes an envelope containing a polyborosiloxane elastomer. The response of the system to applied force optimizes high impact and vibration and repetitive impact shock absorption. The high level of conformability is a key to preventing adverse consequences of prolonged contact.

The invention is a self-conforming, compliant, high impact energy absorbent medium that continuously conforms to the environment in which it is used. At rest the medium acts as a viscous liquid and it offers conformal cushioning and support for a protected object. When a sudden or high rate impact force is applied to the medium it becomes dilatant and rheopectic which causes the composition (a thermo-rheologically complex fluid) contained within an envelope defining a padding article, to become more rigid (or viscous) with an increasing rate of deformation. The medium will stiffen and dissipate energy in accordance with the rate of the force applied to the article. When the external force is not present or is of low rate impact, the medium returns to a lower elastic modulus state and its original conforming condition. The term "rheopectic" defines the property of a composition in which elastic modulus increases with time under shear or suddenly applied force or stress.

In the broadest terms, the present invention provides an energy absorbent and form compliant article for cushioning animate and inanimate objects comprising a pliable, conformable confinement means for containing and controlling the shape and placement of an energy absorbent medium, and a highly conformable and energy absorbent medium confined within said confinement means comprising a viscoelastic, plasticized rheologically dilatant, polymer composition. The polymer exhibits reformable sacrificial chemical bonds which are preferentially broken under high shear conditions and yet quickly reform under low stress conditions.

As used herein viscoelasticity refers to the property of having a high viscosity fluid characteristic under low stress conditions and exhibiting a substantial increase in apparent viscosity under applied stress, so that the material behaves as a solid under such high applied stress conditions. In the context of the present invention, a viscoelastic material is one which behaves as a solid elastomer under high rate impact forces, and as a highly conformable viscous liquid under rest or when subject to a low rate of applied force.

By providing a controlled hysteresis, the absorption of energy by elastic compression can be carefully tuned to serve the requirements of use in a highly protective and efficient fashion. In like fashion, it is possible to control, within limits, the proportion of applied energy returned and transmitted by any elastic rebound, and the proportion dissipated or absorbed and changed into other forms of energy, i.e. heat.

In static circumstances or under a low rate of applied or impact force, the material conforms to the object with which it is in contact by viscous flow. The viscous flow is limited and constrained by the containment system so that it does not result in the material flowing out of areas to be protected. While the composition of the present invention is responsive to stresses by viscous flow, the effect is largely an elastic deformation and flow is limited in the usual time span of normal stresses. At moderate to high stress, such as the imposition of sudden impact, and consequently a high rate of applied force, the material deforms and absorbs or dissipates the imposed energy by viscoelastic deformation or elastic compression. Both the rate of energy absorption, resulting from deceleration of the impact force, and the rate of elastic rebound are controlled by determining the elastic hysteresis. The major effect is spreading the energy transfer associated with the sudden impact over a much greater time span so that the peak incident force levels transferred to the object are reduced.

Upon exposure to prolonged or sudden impact or other stresses, and particularly applied stresses beyond the viscoelastic limit, the polymer cross-link bonds are broken, absorbing energy of the impact, and "deadening" the impact. Polymer chain scission is minimized by the preferential breaking of the cross-link bonds. The energy which breaks the chemical bonds is converted largely to heat. The broken cross-link bonds will be reformed, and the polymer thus has a very substantial life span. Very effective protection from polymer degradation can be provided for a prolonged life of articles in such fashion.

The articles of the present invention preferably employ a borosiloxane elastomer which may be formulated to provided an optimal response to the applied dynamic loading. The high energy absorbent comprises a containing envelope and a polyborosiloxane elastomer composition contained therein. The absorbent envelope can be formed in a variety of shapes and thicknesses. The time required to recover and the actual restoring forces are typically based on the thickness of the structure, as defined by the confining envelope and associated structures; the apparent viscosity, rebound, plastic flow and related properties of the polymer under the applied stress; and the inherent time-dependent response, i.e. hysteresis, of the polymer formulation. Varying any of these properties will also vary the recovery rate of the absorbent article.

The containment envelope may be formed using any flexible material such as a film or sheet of a flexible plastic material, or relatively non-porous fabric, foil, leather, or the like so long as its mechanical and chemical integrity are sufficient to contain a silicone polymer with fluid like behavior.

Polyborosiloxanes have unique elastomeric properties. The fluid will dramatically increase its apparent viscosity to behave as a near solid under sudden impact or shear, a property known in the art as viscoelasticity. This property increases lateral support and impact damping. Under low rates of applied force or stress, polyborosiloxanes readily flow, but under a high rate of applied force or stress they exhibit an increase in apparent viscosity, high compression modulus, and high elastic rebound. These materials also are extremely resilient and experience little permanent deformation after repeated loading. This makes polyborosiloxanes unique as an energy absorbent medium. In addition, the hysteresis of polyborosiloxanes can be altered to optimize the properties for specific applications and environments by the addition of lubricants (plasticizers or dilutents), fillers (thickeners), and the like.

In operation, when the energy absorbent medium described above is installed in an article, such as a sports pad or glove, designed for body contact, it operates to provide the wearer with protective shock absorption and energy dissipation. A significant beneficial characteristic of such a padding article is the ability to adjust or tune the hysteresis and plastic flow when stress is applied to the polymer.

The rebound rate of the article may be tuned to meet the needs of a particular user and/or a particular activity. These factors in combination determine the dynamic loading to which the recovery rate of the article may be tuned. Through tuning, the maximum shock absorption capabilities may be achieved for a variety of specific applications.

Polyborosiloxane elastomers have a wide range of properties and can easily be tailored to a specific viscosity, time dependent mechanical response (elastic hyteresis) and other desirable properties. Borosiloxane polymers can be polymerized or formulated to have a range of relaxation times spanning several orders of magnitude at room temperature.

A high degree of adjustment may be achieved through blending different polyborosiloxanes and by compounding the polymer with lubricants and fillers. The containment envelope itself may be varied in shape, dimensions and details of configuration depending upon the characteristics of the particular application.

For the compounding of the polymer and tuning the hysteresis and related properties, lubricants such as silicone oils, fatty acids, and fatty acid salts and greases may be used. Solid particulate fillers such as solid particulate or fibrous fillers, such as silica, or microspheres of silica, phenolic resins or thermoplastics, may be used.

The above-described novel high impact energy absorbent material compositions have numerous uses and applications. The following are representative padding article applications illustrative of the breadth of beneficial uses for the novel absorbent material compositions:

(1) Sports padding articles such as shoulder pad lining, rib protection, shin guards, hip and thigh pads in athletic gear. The protective high impact energy absorbent composition may also be embodied in the form of a bandage, elastic sleeve, or the use of wrapping material such as gauze to secure the composition to protect the limb of a human body in addition to the use of a padding article;

(2) Hand protecting padding articles, including gloves, for use in sports and industry;

(3) Seat padding articles for motor vehicles such as race car absorbent in seats to dissipate high vibration, g-force side-loads and shock. The high impact energy absorbent response of the seat padding article will relieve pressure points created by uneven, rough road surfaces hard seating surfaces and crashes;

(4) Medical padding articles for use as "blocks" to support patients during procedures such as X-ray, neck braces, or as conformal absorbent and cushioning to uniformly support the body weight of persons with limited or no motor skills such as a paraplegic. Such padding articles can be used to support body weight without allowing pressure points, without allowing the material to "bottom out" or without allowing the material to take a "one-time set" to a particular shape as is the case with many traditional padding materials. The absorbent medium can be used to support a person in a sitting position (i.e., a wheelchair) or laying flat (i.e., a hospital bed). The medium will totally conform to the user without creating voids between uneven surfaces and the anatomy of the patient;

(5) Extreme trauma protection padding articles for use in combination with other protective gear. A bullet proof vest with the novel medium as a backing will produce a vest that dissipates the energy transferred through the vest after being impacted by a bullet;

(6) Subsurface padding articles for use, as an example, beneath an artificial surface of an athletic field to provide cushioning and energy dissipation to provide comfort and reduce injuries. The padding article for an athletic field may consist of a number of separate "cells" exhibiting different impact response characteristics. For example, the infield area of a baseball field could be made "softer" than the outfield area.

(7) Industrial and military equipment padding articles to provide shock and vibration dissipation in applications such as motor mounts, and mounts for weaponry on board naval ships;

(8) Packaging padding articles to protect objects such as electronic equipment during shipping; and (9) In situ padding articles that can be formed in the field to protect an injured area of a person from further injury by placing the conformal absorbent medium in contact with the injured area and placing a conventional wrap over the medium to secure it.

It has been found that the requirements of protecting an object, including the human body from impact, vibration, repetitive stress and prolonged contact stress can be enhanced by articles or structures containing the novel composition which afford several specific characteristics.

The structures to be employed should provide the maximum contact surface consistent with the required configuration of the structure or the article or device of which it is a part;

The structures must be highly conformable to the body surface configuration;

The structures must freely change conformation to preserve high conformity to the body surface configuration with changes in position or posture of the body;

The structure should respond elastically to a high rate of applied impact forces between the body or object and the structure; and The structure ordinarily should not impair or interfere with normal body functions such as limiting the range of motion or the like.

It has been found that the requirements of protecting the body from high kinetic energy impact stress can be enhanced by structures which afford several additional specific characteristics;

Attenuation is, in part, a function of both elastic and plastic or fluid deformation. Impact energy should be transmitted through the medium in lateral directions, at angles to the axis of the impact motion, i.e., spreading the impact energy over as wide an area as possible;

Attenuation is also, in part, a function of the time for transmission of stress to the body. An impact force varies with the square of the speed;

An important additional factor is the rate and magnitude of elastic rebound.

The requirements of these two major categories of object contact and protection share a substantial number of common considerations and demands and are generally similar, except that the high impact protection has additional criteria not required of low stress, prolonged contact.

The demands of repetitive motion stress and vibration protection share the requirements of both prolonged body contact and high impact stress, and have additional requirements and characteristics.

The present invention provides a cushioning and energy-absorbent medium and articles made therefrom which meet these criteria, for both static and low-stress prolonged contact and for high rate impact contact in a highly effective manner to provide for superior performance when compared to the padding and cushioning materials of the prior art.

Other advantages of the present invention will become apparent from a perusal of the following detailed description of presently preferred embodiments of the invention taken in connection with the accompanying drawings.

DETAILED DESCRIPTION

Figure 1:
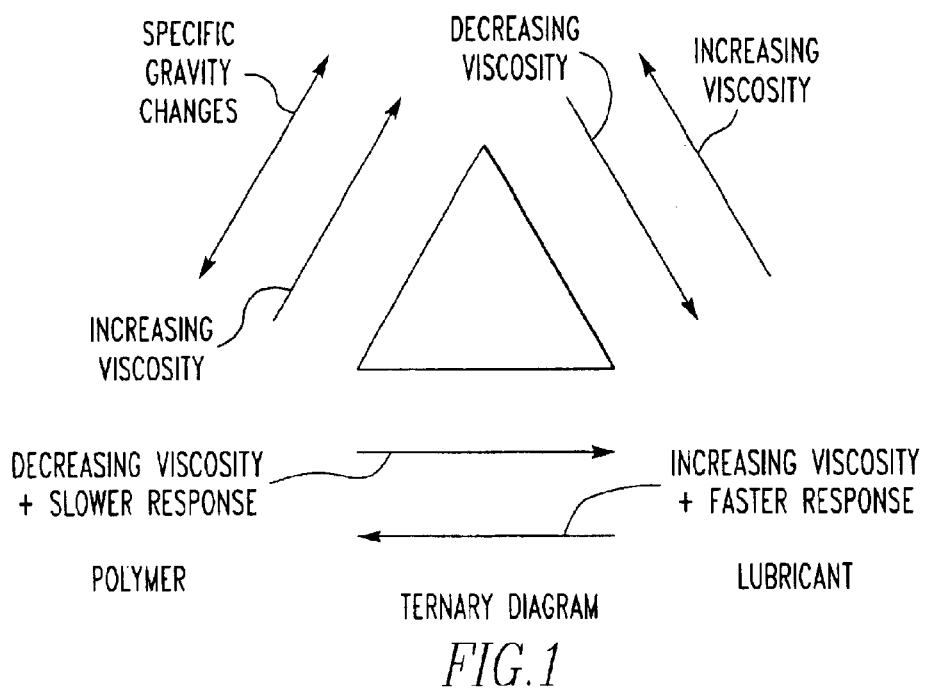
FIG. 1 is a ternary diagram relating the amounts of polymer, lubricant and filler components of the present invention to viscosity, or elastic modulus, and response time of the absorbent medium.

The present invention provides an energy absorbent medium and a method for producing high impact energy absorbent formulations and articles therefrom using polymer-based materials to create a "smart" padding system which may be customized for specific applications. At rest, or in response to a low rate of applied force, the absorbent provides conformable cushioning and support with the ability to adjust and reshape itself to the anatomy of the object or user. Upon sudden impact, or a high rate of applied force, the absorbent reacts to the shear forces, or g-force loading, and rapidly stiffens to dissipate energy, shock and vibration.

The novel polymer composition is a complex fluid comprising a polymer blended with a lubricant and a filler at a ratio to produce an energy absorbent material response which is appropriate for a given application. The polymer composition is a putty-like material that does not exhibit flow at room temperature unless a force is applied. This characteristic of the composition contributes to the desired conformal property of the absorbent medium.

The lubricant (which may be a liquid or pasty lubricant) and the filler (which typically is a finely divided solid filler) are dispersed throughout the polymer via a mechanical means. The lubricant exhibits either liquid or paste qualities which inherently provides little or no support or energy absorption.

A suitable polymer is one that exhibits hydrogen bonding. These hydrogen bonds result from a dipole interaction between polymer chains. The hydrogen bonds formed are not permanent covalent bonds, but are labile or reformable bonds which provide the dilatant behavior characteristic of polyborosiloxanes. Polymers that exhibit hydrogen bonding, in addition to polyborosiloxanes include, Xanthan gum, guar gum, polyvinylalcohol/sodium tetraborate, as well as other hydrogen bonding polymer compositions. Polyborosiloxane exhibits a very high resiliency or energy return characteristic in the pure form.

Suitable fillers are typically inert materials which range from free-flowing to caking powders, micropheres, pulp, fibers, microcellular foams, closed-cell foams and other materials.

While none of the composition components itself demonstrates the necessary properties to achieve the desired shock absorbing and energy dissipation, their blending creates a non-slumping fluid which exhibits the desired rate dependent characteristics.

The novel high impact energy absorbent material compositions based on this invention exhibit a time or rate dependent response to an applied force or deformation which enables the customizing of the response of these material formulations to different types of loading and deformation situations. The material formulation may be tailored through the addition of an incompatible lubricant which effectively increases the distance between polymer chains. This has the effect of decreasing the strength of and quantity of the hydrogen bonds. Both the alteration of the dipole interaction between polymer chains and decreasing the number of dipole interactions results in altering the time dependent and rate dependent behavior of the material formulation.

A high impact energy absorbent material made in accordance with this invention behaves at times as a cross linked elastomer and at other times as a viscous fluid. This thermorheologically complex behavior results in the unique behavior and subsequent performance of the high impact energy absorbent material compositions. While the response of the composition to sudden impact forces is generally described in terms of energy absorbing for the purpose of convenience, these compositions actually absorb little energy. Rather, the time dependent, or rate dependent, response of the material composition to sudden impact enables the distribution of a localized load or impact over a larger surface area and over a longer period of time which results in lower peak stresses being transmitted to the protected animate or inanimate object. The energy absorption through plastic or viscous deformation is minimal. This can be demonstrated by loading the novel absorbent material composition cyclically and observing that the resultant thermal increase is minimal.

The fillers used are preferably added to stabilize what is often an otherwise thermodynamically unstable mixture and to increase the viscosity to the point of a non-slumping putty-like material composition. Using a filler material such as pulp or fiber increases the tear strength of the composition and provides the energy dissipation.

An example of an energy absorbent medium made in accordance with this invention is a 100 pph (parts per hundred) of polyborosiloxane polymer, 60 pph of a metal soap gelled paraffinic lubricant, and 20 pph of plastic microspheres. This is equivalent to a composition of 60%, 30% and 10% respectively.

The ratio of the composition components is determined by the desired absorbent performance for a given application.

Referring to the ternary diagram of FIG. 1, the medium compositions which have more filler have higher viscosities or elastic modulus, and are less conformable. Medium compositions having more polymer have a faster response time, and those with more lubricant are less viscous and have a slower response time. Medium compositions with higher viscosities have faster shear response times than lower viscosity compositions.

The absorbent medium composition typically includes a hydrogen bonded polymer which has its time-dependent (hysteresis) properties modified by the addition of a lubricant and a filler to make the composition highly viscous at room temperature.

The composition is a mixture of materials which results in a fluid which does not exhibit flow at room temperature. The composition, which is preferably comprised of a silicone polymer, a lubricant and a filler, is a highly viscous fluid at room temperature. When a padding article employing the composition is exposed to a high rate energy impact, the composition responds by increasing its apparent viscosity and subsequently transferring the energy in a longer time than the time it is exposed to the impact, which decreases the maximum or peak force transferred to the protected human body or object. This inherent property of the composition is ideal for use as a shock absorber or energy attenuating pad for protection of the human body as well as other objects. The shock absorbing material composition is suitable for packaging or encapsulation in a containment or envelope for use in high impact energy absorbent or protective gear.

Figure 2A:
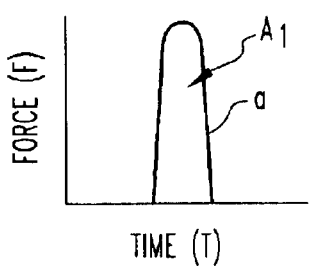
FIGS. 2(a), 2(b) and 2(c) are graphical illustrations of the performance of two traditional pads and a padding article made in accordance with the present invention.
Figure 2B:
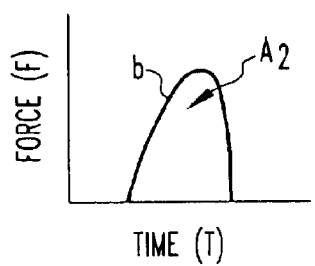
Figure 2C:
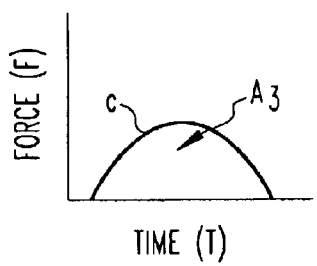

The unique performance of a padding article employing a material composition made in accordance with the present invention is illustrated in FIG. 2 where the response of such a padding article to a sudden, or high rate, applied force is compared to the response of traditional padding materials. The curves (a), (b) and (c) of FIGS. 2(a), 2(b) and 2(c) are plots of the force (F) transferred to an object protected by the respective pads over time (T). The curve (a) corresponds to the response of a rigid plastic pad; curve (b) corresponds to the response of a soft rubber, or gel pad; and curve (c) corresponds to the response of a pad article made in accordance with the present invention.

The energy dissipation of the applied force is the integral of the force (F) as a function of time (T).

If all the kinetic energy is ultimately transferred to the object protected by the pads, areas A1, A2 and A3 under the curves (a), (b) and (c) will be equal. However, it is apparent that the impact of the applied force on the protected object differs dramatically.

The rigid plastic pad response as illustrated in FIG. 2(a) transfers the applied force as a high peak stress in a short period of time and impacts a limited surface of a protected object.

The soft rubber, or gel, pad response as illustrated in FIG. 2(b) transfers the applied force as a moderate peak stress over somewhat longer period of time than the rigid plastic pad and impacts a slightly larger surface of the protected object.

The response of the padding article made in accordance with the present invention, as illustrated in FIG. 2(c), transfers the applied force as a low peak stress over an extended period of time, over a larger surface of the protected object, thereby minimizing the peak force impacting the object.

The following is representative of compositions, formulations and their applications:

| COMPOSITION | APPLICATION |
| --- | --- |
| 60% Polyborosiloxane | Exhibits high rate impact response. |
| 30% Paraffinic Grease | Suitable for sports padding. |
| 10% Pulp Fiber | |
| 60% Polyborosiloxane | Exhibits very low flow, very low density. |
| 20% Paraffinic Grease | Suitable for shoe padding. |
| 20% Plastic Microspheres | |
| 50% Polyborosiloxane | Exhibits a response to an applied force |
| 35% Parafinnic Grease | suitable for cushions. |
| 15% Powdered Plastics | |

Figure 3A:
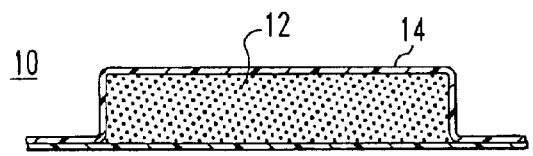
FIGS. 3(a) and 3(b) are illustrations of a padding article made in accordance with the present invention.
Figure 3B:
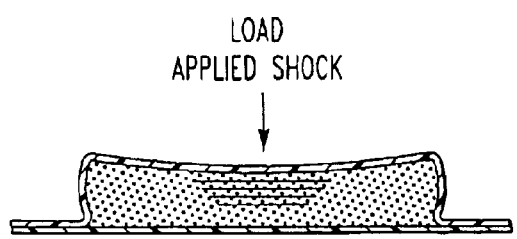
Figure 4A:
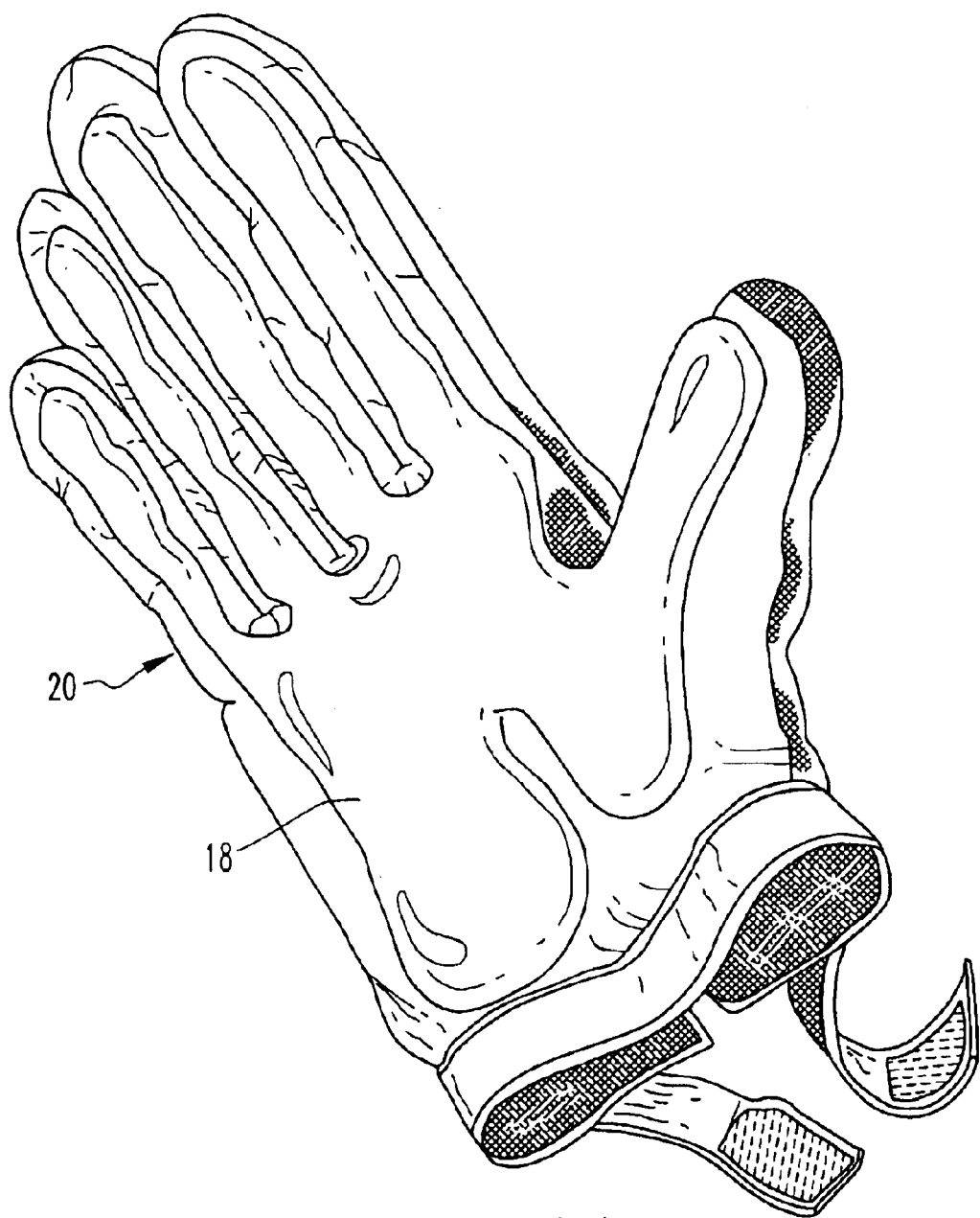
FIGS. 4(a) and 4(b) are illustrations of an application of the novel padding composition in a sports glove.
Figure 4B:
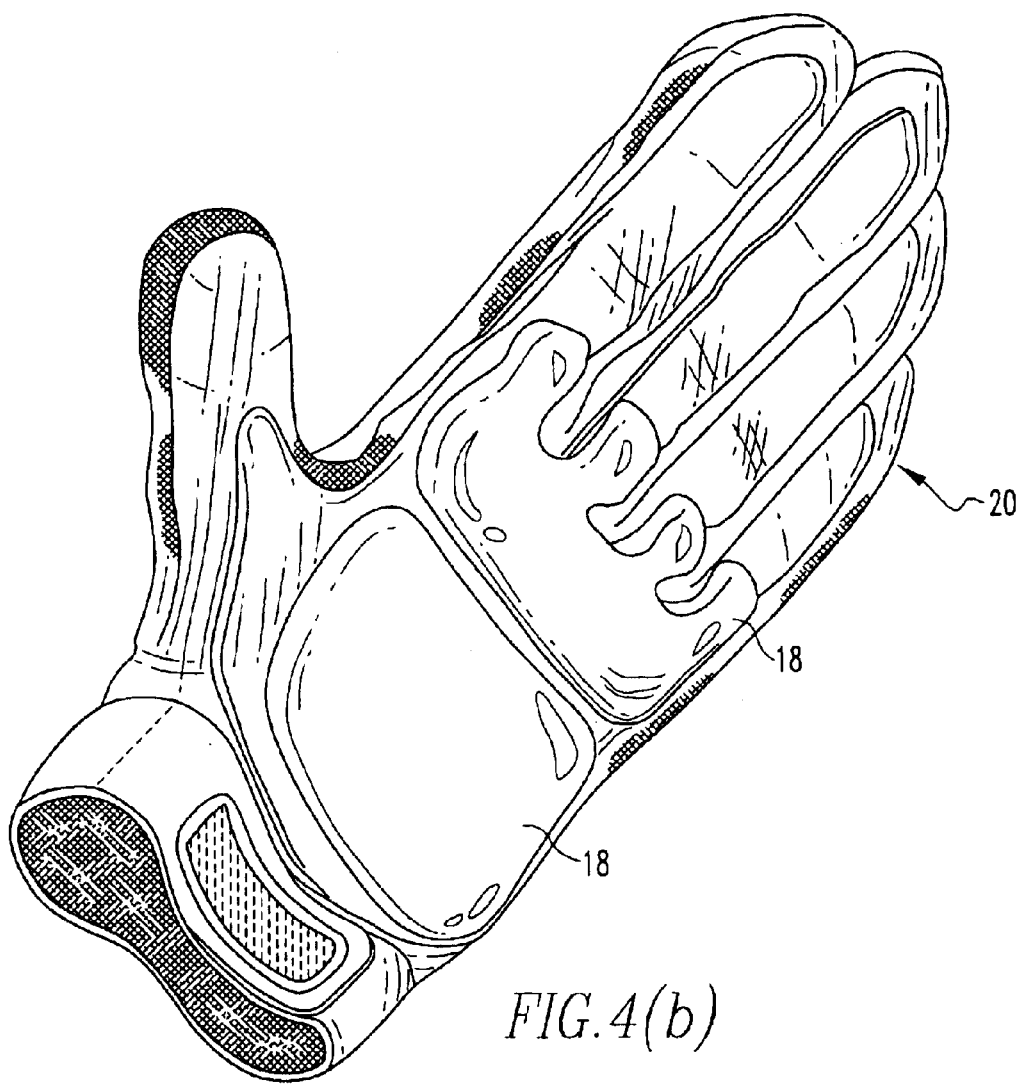
Figure 5:
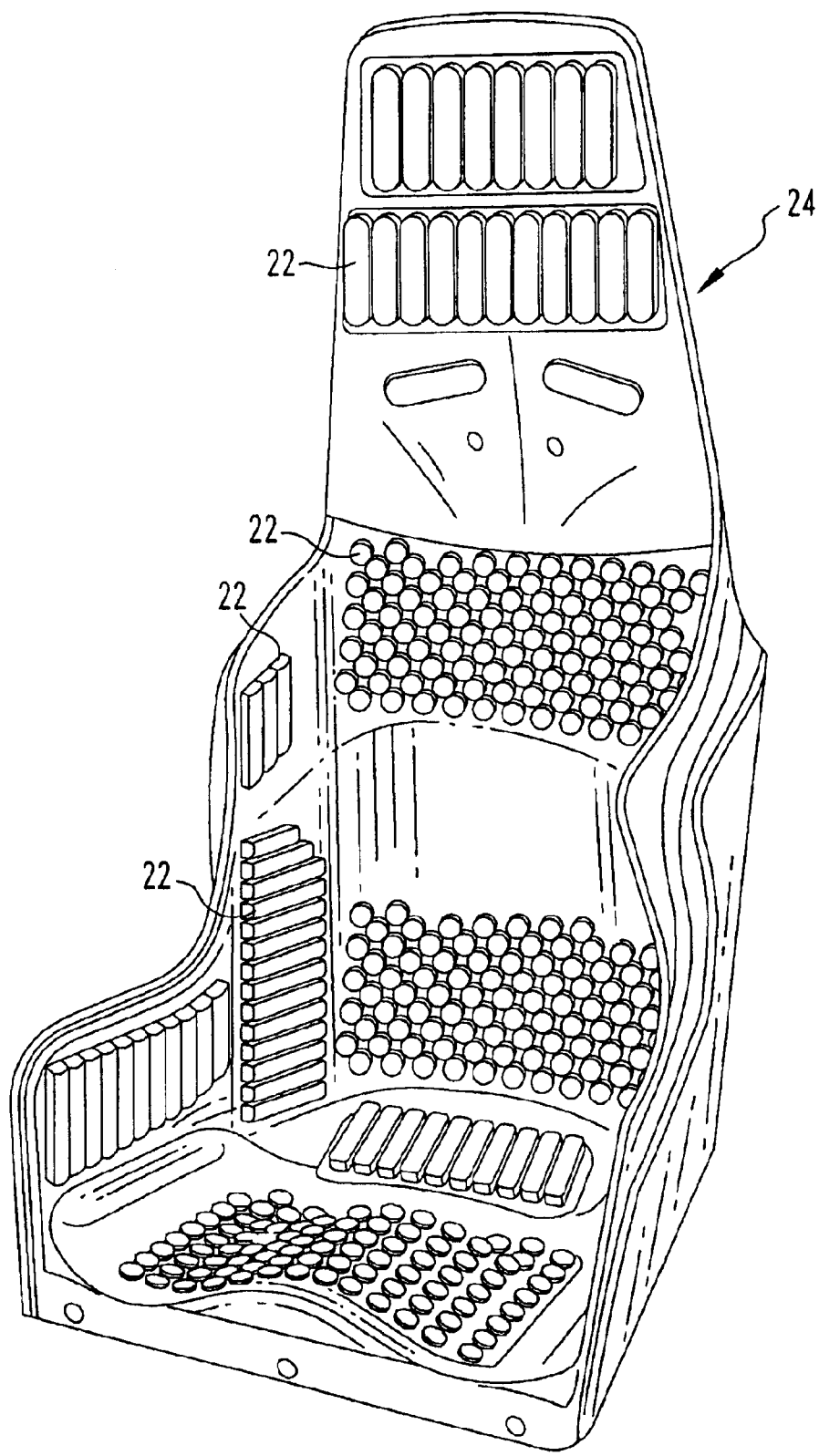
FIG. 5 is an illustration of an application of the novel padding composition in the seat of a race car.

An embodiment of the invention as a padding article 10 is illustrated in FIGS. 3(a) and 3(b) wherein the novel material composition 12 is packaged within a containment 14. FIGS. 4(a) and 4(b) illustrates the application of the novel material composition as padding inserts 18 in a sports glove 20 while FIG. 5 illustrates the use of the novel material composition as padding elements 22 of a race car seat 24.

Figure 6A:
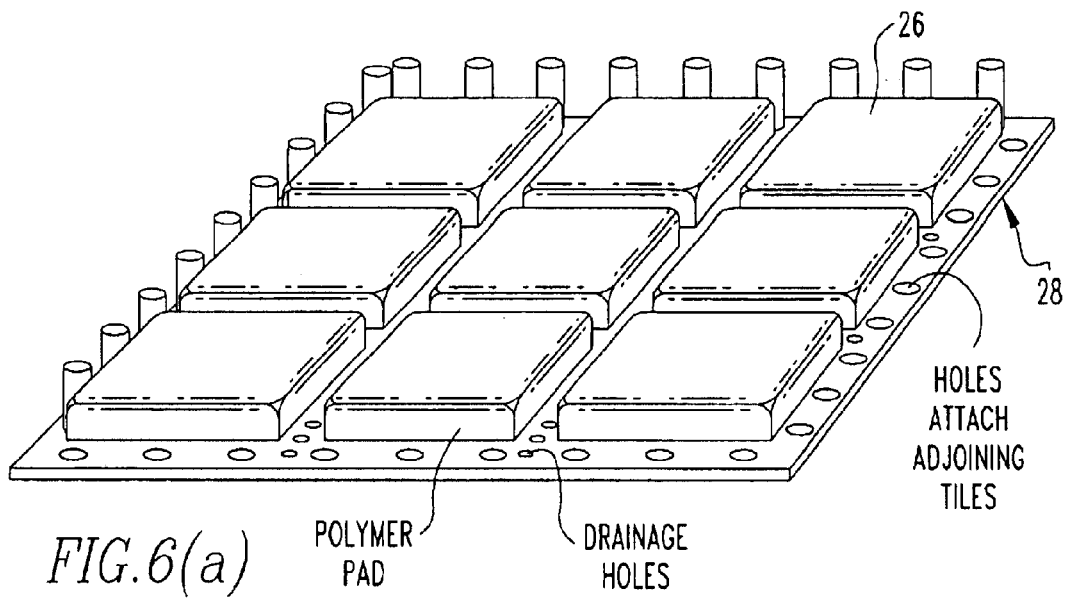
FIGS. 6(a) and 6(b) illustrate the application of the novel padding composition to an athletic playing field.
Figure 6B:
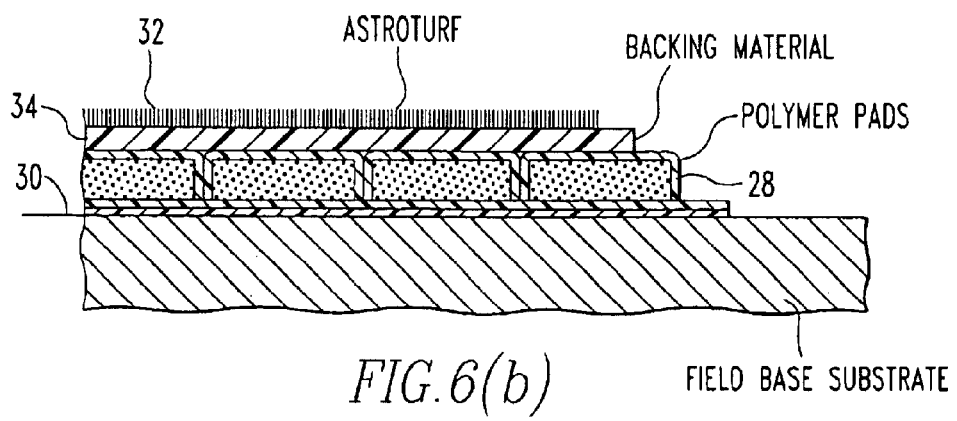

As shown in FIGS. 6(a) and 6(b), padding cells 26 made in accordance with the present invention may be packaged in tiles 28, and multiple tiles positioned between the surface of an athletic playing field 30, and the artificial surface 32 and backing 34 to provide energy dissipation and reduce injuries. Other surfaces such as a basketball floor, boxing ring, etc. could benefit from the novel padding medium.

Figure 7A:
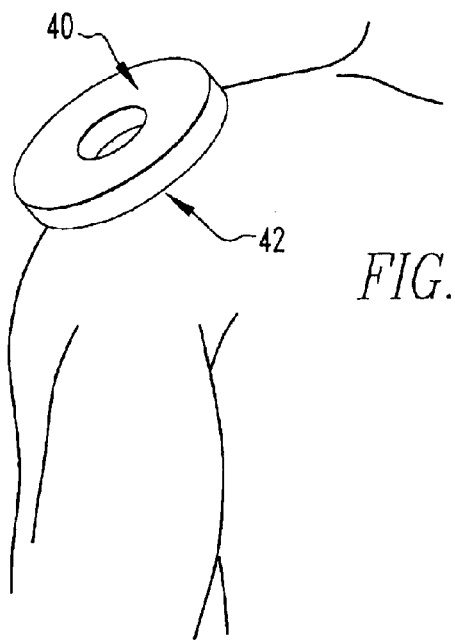
FIGS. 7(a), 7(b) and 7(c) are pictorial illustrations of various padding configurations incorporating the novel medium of the present invention.

FIG. 7(a) is an illustration of a padding article 40 designed to protect the shoulder 42 of a human body.

Figure 7B:
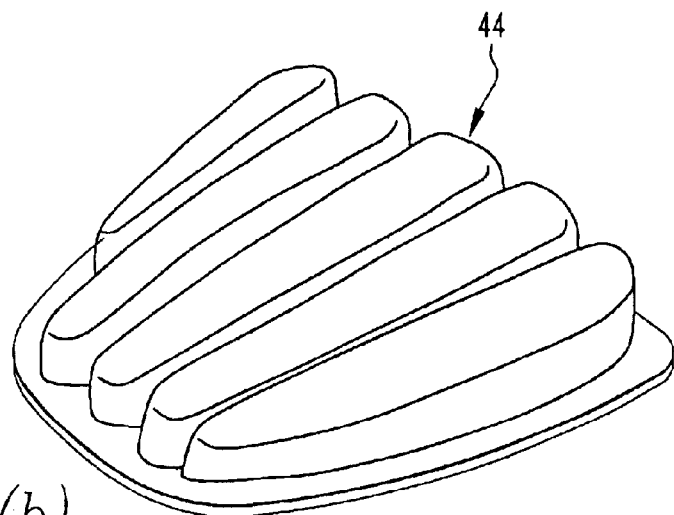
Figure 7C:
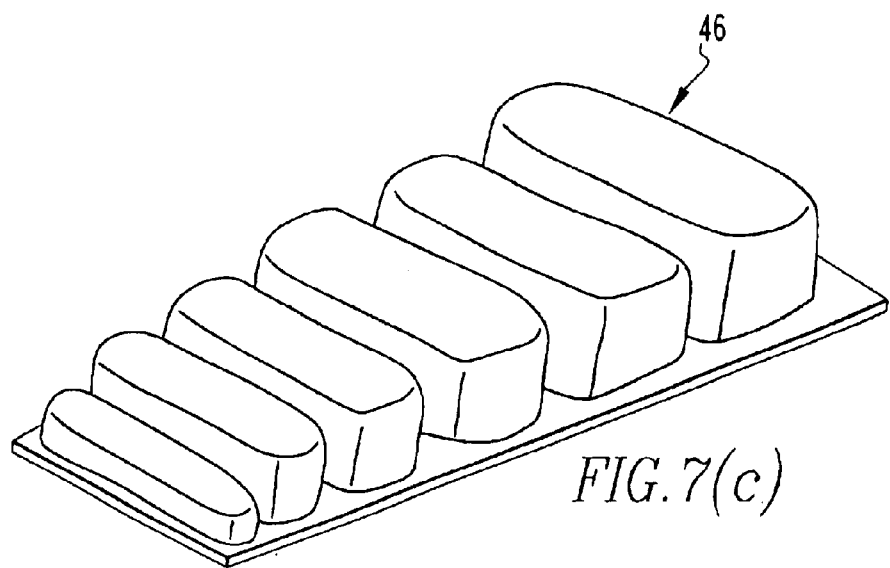

FIGS. 7(b) and 7(c) are illustrations of padding articles 44 and 46 respectively for use as a pad to protect the shoulder, thigh, hip or shin of a human body.

The preferred embodiment of the current invention is a polymer composition which is prepared as a blend of a polyborosiloxane polymer which exhibits a high degree of intermolecular bonding, a lubricant which is preferably a hydrocarbon-based grease or fluid, and a filler which can be selected from microspheres, powdered plastics, ceramics, metals or fibers and pulps material fillers. Filler is added in an amount to minimize the inherent energy return of the polymer but less than an amount that would make the composition take on the characteristics of the filler.

A base polymer, which exhibits intermolecular or hydrogen bonding, can be mechanically blended with a filler and a lubricant to produce a composition which has a rate-dependent, mechanical response to applied loads or forces. The more lubricant added to the medium, the longer the response time. The base polymer is a highly resilient material and exhibits a near complete energy return and instantaneous response to an applied load and provides the rate dependent response of the composition. The lubricant provides the conformability of the composition thus allowing the polymer to shear without fracture. The filler, which does not flow, serves to stabilize the composition.

The preferred characteristics of the novel composition include the non-slumping or lack of cold flow of the mixture. The composition will conform as an applied load deforms the composition such as in a seat pad. However, the static viscosity of the composition is sufficiently high that little or no flow occurs without an applied load.

It is also preferred that the lubricant be totally miscible with the polyborosiloxane so as to make a mixture which is not completely thermodynamically stable. To this mixture is added sufficient filler to produce the desired characteristics of shock attenuation and static viscosity. If a low density filler is added, it decreases the apparent density of the medium.

The preferred range of composition is, in weight percentages, from 90% polymer to less than 20% polymer; lubricant from about 20% to about 60%; and filler from 0 to 90%, dependent on the particle size and specific gravity of the filler. A typical high-impact, energy-absorbent material formulation in accordance with this invention would be 70% polyborosiloxane; 20% lubricant; and 10% filler.

The fillers are desirably of small particle size and low hardness. As there may be particle-to-particle contact, the composition should not behave as a monolithic block of the filler. What has been used and found desirable are roughly equivalent volumetric amounts of a mixture of polymer and lubricant to the filler. It is highly desirable that the filler have a cohesive interaction with the polymer/lubricant blend, i.e., so that either the polymer or the lubricant (or both) will wet the surface of the filler to provide a viscosity enhancement to the blend over and above that of a noninteracting filler.

A high-impact, energy-absorbent medium of a blend of polyborosiloxane with a lubricant and filler made for use in high-impact situations was tested by firing a 9 mm round from a pistol into bulletproof vest backed by an absorbent composition of this invention. Bulletproof vests, typically made using Kevlar fabrics, will stop most bullets from penetrating the vests; however, the impact of the energy-absorbed by the user of the vest is significant. Injuries such as severe bruising, broken bones and internal hemorrhaging occur when a bullet impacts the vest, resulting in long recovery times and, in some cases, death—even though the bullet did not penetrate the victim.

A test was conducted to view the energy-dissipating capability of the inventive medium under extremely high rates of energy impact. It consisted of firing a pistol at close range into a bulletproof vest with and without the use of the novel high-impact, energy-absorbent composition. Shots were fired at close range (i.e., three feet) to observe trauma. A first test was conducted without the use of the novel energy-absorbent medium. A second test was conducted to observe the benefits of using the novel medium placed inside of the vest and against the torso of a mannequin.

In the first test, the bulletproof vest was placed over a hollow mannequin torso made from a material that replicated bone. A 9 mm pistol was discharged into the bulletproof vest from three feet. The 9 mm round did not penetrate the vest; however, a four-inch hole was created in the mannequin from the shock that passed through the vest due to the high energy impact.

In the second test, a high-impact, energy-absorbent medium consisting of a blend of polyborosiloxane, a lubricant and filler was placed behind the bulletproof vest Once again, a 9 mm pistol was discharged into the bulletproof vest from three feet. The result of the test showed no sign of impact on the mannequin torso. The test was conducted three times—all with the same results. The medium remained a fluid at rest before and after the force was applied. During the test, the energy-absorbent medium responded to the sudden and high shear force resulting from the impact of the bullet by stiffening appropriately to dissipate high volumes of energy in a very short cycle time.

The applications of the novel energy-absorbent medium of the invention are numerous.

The energy-absorbent and form-compliant medium of the present invention, when applied to a steering wheel of a motor vehicle, offers highly desirable properties. Typically, a plurality of capsules of the present invention are connected to and extend around the steering wheel. Each of such capsules is disposed at selected intervals around the steering wheel. It is appreciated that one capsule could be incorporated into the steering wheel without departing from the spirit of the invention. For example, one continuous loop of a capsule could be incorporated into the steering wheel.

Other types of equipment, such as sporting equipment, can employ the features and benefits of the present invention. A golf club, for example, includes a head, a shaft and a handle wrapped with a handle grip. The handle grip may be fabricated from the energy-, absorbent and form-compliant medium of the present invention, or the medium may be included in the shaft.

A tennis racket includes a head and face, a throat and tennis handle wrapped in a tennis grip. The tennis grip may be fabricated, in part, from the energy-absorbent and form-complaint medium of the present invention.

A baseball bat includes a handle segment which, in some contexts, may have a grip wrapped around it. The baseball grip may be fabricated from the energy-absorbent and form-compliant medium of the present invention.

What is claimed is:

1. An impact energy absorbent medium comprising at least one polymer which has energy absorbing properties and dilatant viscoelastic flow properties, and a lubricant;
   wherein the lubricant is present in the amount of at least 20%; and
   wherein the at least one polymer and lubricant are selected from the group consisting of:
     polyborosiloxane and grease,
     polyborosiloxane and fatty acid,
     polyborosiloxane and fatty acid salts,
     xanthan gum and silicone oil,
     guar gum and silicone oil, and
     polyvinyl alcohol sodium tetraborate and silicone oil,
       characterized in that the medium is a highly viscous fluid which does not exhibit flow at room temperature unless a force is applied, and which; includes a quantity of fibrous filler and further wherein said fibrous filler is a fibrous material wettable by either the polymer or the lubricant or both.

2. The impact energy absorbent medium of claim 1, wherein said polymer is polyborosiloxane.

3. The impact energy absorbent medium of claim 1, wherein said polymer is xanthan gum.

4. The impact energy absorbent medium of claim 1, wherein said polymer is guar gum.

5. The impact energy absorbent medium of claim 1, wherein said polymer is polyvinyl alcohol sodium tetraborate.

6. The impact energy absorbent medium of claim 1, wherein said impact energy absorbent medium is conformable under applied force.

7. The impact energy absorbent medium of claim 1, wherein the polymer content is from about 90 weight % to about 20 weight %, the amount of lubricant is from about 60 weight % to about 20 weight %, and the amount of filler is from about 90 weight % to about 0 weight %, and wherein the sum of polymer, lubricant and filler weight percentages is equal to or less than 100%.

8. The impact energy absorbent medium of claim 1, wherein the polymer and the lubricant are blended.

9. An impact energy absorbent article comprising:
   an impact energy absorbent medium according to claim 1 confined by a containment envelope.

10. An impact energy absorbent medium comprising at least one polymer which has energy absorbing properties and dilatant viscoelastic flow properties, and a lubricant;
    wherein the medium is a highly viscous fluid which; does not exhibit flow at room temperature unless a force is applied; and
    wherein the at least one polymer and lubricant are selected from the group consisting of:
      polyborosiloxane and grease,
      polyborosiloxane and fatty acid,
      polyborosiloxane and fatty acid salts,
      xanthan gum and silicone oil,
      guar gum and silicone oil, and
      polyvinyl alcohol sodium tetraborate and silicone oil,
        characterized in that the medium includes a quantity of fibrous filler and further wherein said fibrous filler is a fibrous material wettable by either the polymer or the lubricant or both.

11. The impact energy absorbent medium of claim 10, wherein said polymer is polyborosiloxane.

12. The impact energy absorbent medium of claim 10, wherein said polymer is xanthan gum.

13. The impact energy absorbent medium of claim 10, wherein said polymer is guar gum.

14. The impact energy absorbent medium of claim 10, wherein said polymer is polyvinyl alcohol sodium tetraborate.

15. The impact energy absorbent medium of claim 10, wherein said impact energy absorbent medium is conformable under applied force.

16. The impact energy absorbent medium of claim 10, wherein the polymer and the lubricant are blended.

17. An impact energy absorbent article comprising:
an impact energy absorbent medium according to claim 10 confined by a containment envelope.

18. An impact energy absorbent medium comprising at least one polymer which has energy absorbing properties and dilatant viscoelastic flow properties, and a lubricant;
wherein the at least one polymer and lubricant are selected from the group consisting of:
polyborosiloxane and grease,
polyborosiloxane and fatty acid,
polyborosiloxane and fatty acid salts,
xanthan gum and silicone oil,
guar gum and silicone oil, and
polyvinyl alcohol sodium tetraborate and silicone oil, characterized in that the medium is a highly viscous fluid which does not exhibit flow at room temperature unless a force is applied, and which includes up to about 90% by weight of a quantity of fibrous filler and further wherein said fibrous filler is a fibrous material wettable by either the polymer or the lubricant or both.

19. The impact energy absorbent medium of claim 18, wherein said polymer is polyborosiloxane.

20. The impact energy absorbent medium of claim 18, wherein said polymer is xanthan gum.

21. The impact energy absorbent medium of claim 18, wherein said polymer is guar gum.

22. The impact energy absorbent medium of claim 18, wherein said polymer is polyvinyl alcohol sodium tetraborate.

23. The impact energy absorbent medium of claim 18, wherein said impact energy absorbent medium is conformable under applied force.

24. The impact energy absorbent medium of claim 18, wherein the polymer and the lubricant are blended.

25. An impact energy absorbent article comprising:
an impact energy absorbent medium according to claim 18 confined by a containment envelope.

26. The impact energy absorbent article of claim 25, wherein the article comprises sports padding.

27. The impact energy absorbent article of claim 25, wherein the article comprises packaging padding.

28. The impact energy absorbent article of claim 25, wherein the article comprises a shock mount.

29. The impact energy absorbent article of claim 25, wherein the article comprises a bulletproof vest.

30. A method for forming an impact energy absorbent medium comprising the step of blending at least one polymer which has energy absorbing properties and dilatant viscoelastic flow properties with a lubricant;
wherein the at least one polymer and lubricant are selected from the group consisting of:
polyborosiloxane and grease,
polyborosiloxane and fatty acid,
polyborosiloxane and fatty acid salts,
xanthan gum and silicone oil,
guar gum and silicone oil, and
polyvinyl alcohol sodium tetraborate and silicone oil, characterized in that the medium is a highly viscous fluid which does not exhibit flow at room temperature unless a force is applied, and which includes up to about 90% by weight of a quantity of fibrous filler and further wherein said fibrous filler is a fibrous material wettable by either the polymer or the lubricant or both.

31. The method of claim 30, wherein said polymer is polyborosiloxane.

32. The method of claim 30, wherein said polymer is xanthan gum.

33. The method of claim 30, wherein said polymer is guar gum.

34. The method of claim 30, wherein said polymer is polyvinyl alcohol sodium tetraborate.

35. The method of claim 30, wherein said impact energy absorbent medium is conformable under applied force.

36. The method of claim 30, wherein said impact energy absorbent medium has a polymer content from about 90 weight % to about 20 weight %, a lubricant content from about 60 weight % to about 20 weight %, and a filler content from about 90 weight % to about 0 weight %, and wherein the sum of polymer, lubricant and filler weight percentages is equal to or less than 100%.

37. An impact energy absorbent medium comprising at least one polymer which has energy absorbing properties and dilatant viscoelastic flow properties, and a lubricant;
wherein the medium is a highly viscous fluid which; does not exhibit flow at room temperature unless a force is applied; and
wherein one of the polymer and the lubricant is an organic substance, and wherein the other of the polymer and the lubricant is a silicone substance, characterized in that the medium includes a quantity of fibrous filler and further wherein said fibrous filler is a fibrous material wettable by either the polymer or the lubricant or both.

38. A padded sports article comprising a containment boundary surrounding an impact energy absorbent article containing an impact energy absorbent medium, said impact energy absorbent medium containing a polymer and a lubricant in admixture, said polymer having energy absorbing properties and dilatant viscoelastic flow properties, said impact energy absorbent medium including a quantity of fibrous filler, further wherein said fibrous filler is a fibrous material wettable by either the polymer or the lubricant or both, and said medium being further characterized in that, notwithstanding the presence of both the polymer and the lubricant, the impact energy absorbent medium is a highly viscous fluid which does not exhibit flow at room temperature unless a force is applied.

* * * * *